May 24, 1932.  E. W. BOYER  1,859,728
CHICKEN FEEDER
Filed March 11, 1929

Inventor
Edwin W. Boyer.

By
Attorney

Patented May 24, 1932

1,859,728

UNITED STATES PATENT OFFICE

EDWIN W. BOYER, OF THORNTOWN, INDIANA

CHICKEN FEEDER

Application filed March 11, 1929. Serial No. 346,180.

My invention relates to poultry feeders of the fountain or buttermilk type, and it is an object of the invention to provide a device of this character which is not only simple and inexpensive in construction and which may be easily kept sanitary, having a detachable jar holder of simple construction, but one which will accommodate jars with necks of various sizes with threads of different pitch, all as will be hereinafter more particularly described and claimed.

Figure 1:
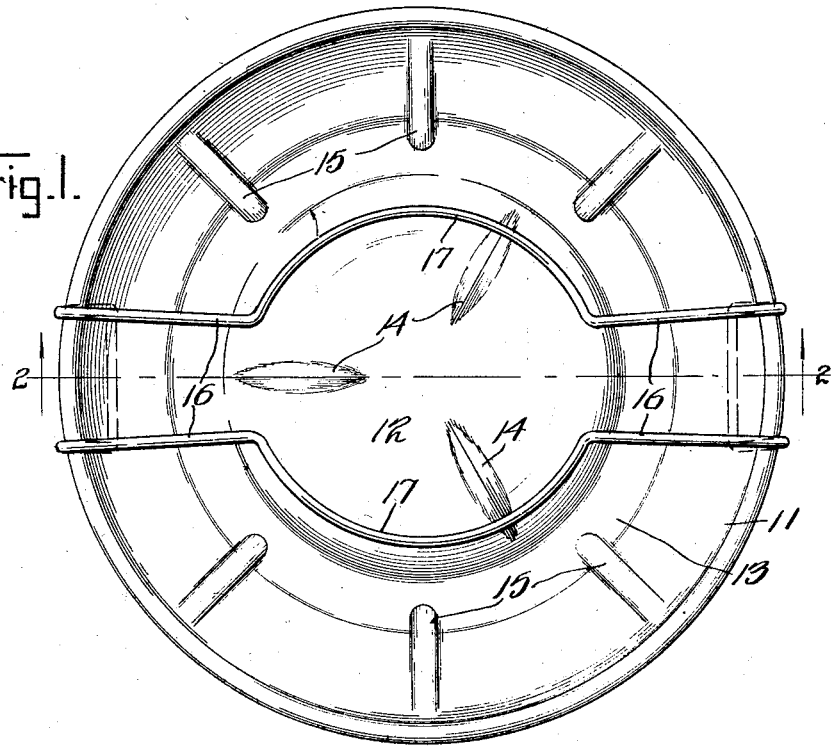
Figure 2:
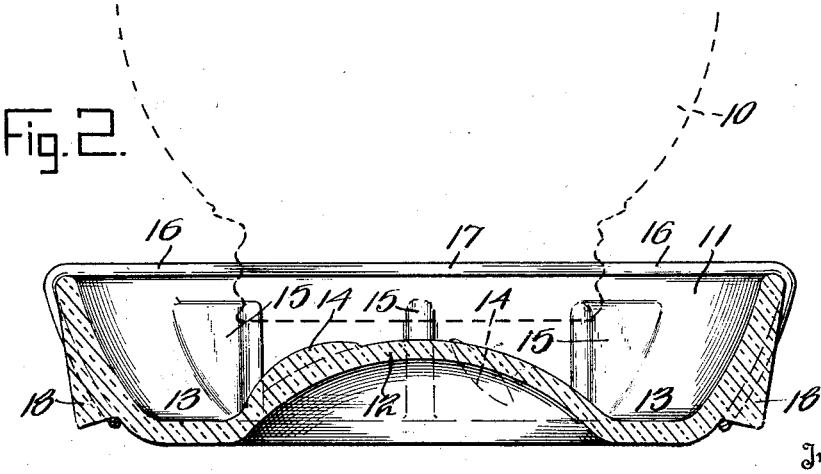

Referring to the accompanying drawings, which are made a part hereof and on which similar reference characters indicate similar parts, Figure 1 is a top plan view illustrating one application of my invention, and Figure 2 is a section on line 2—2 of Fig. 1.

In the drawings reference character 10 indicates a receptacle or container for water, buttermilk or other material to be dispensed, which container may be an ordinary screw top fruit jar.

A saucer 11 forms a dispensing trough or base for the feeder when the jar 10 is supported therein, said saucer 11 being of a size to form a circular trough about the jar from which the material contained in the jar may be freely dispensed to poultry. The center of the saucer or base 11 is provided with a convexly curved portion 12 in order to direct the food stuff or the like outwardly toward the rim 13, and in order to prevent the mouth of the jar from seating tight against the convexly curved portion, spaced radially disposed elongated projections 14 are formed on the upper surface of the convex portion. Also around the inner portion of the rim are formed upright inwardly extending projections 15 which are designed to prevent the chicks from getting wet and drowning, thus permitting considerable depth of liquid at all times, and such projections also strengthen the trough 11.

An elongated jar support or holder is provided, consisting of a single piece of wire having its extremities fastened together and having a pair of substantially parallel side members 16 provided with opposed central portions 17 curved outwardly to conform to the circular neck of a fruit jar or other form of receptacle, and with the extremities of the side members extending down in converging relation over the exterior of the rim of the trough and beneath lugs 18 on the trough.

While I have described the member 10 as a fruit jar, I do not limit myself to fruit jars alone, but I use any desired kind of receptacle, including straight side jars or vessels of small or large capacity.

In the use of the device buttermilk or other foodstuff is put into the jar or container 10 and the base is placed on the top and the vessel inverted so that the trough around the jar will be filled, so that the fowls may have easy access thereto. The jar may be adjusted vertically so as to bring the opening between the end of the neck and the top surface of the convex base at the proper distance apart. As the foodstuff is utilized it will continue to flow out of the container into the trough until it is all exhausted, the supply being according to consumption. In this manner the food substance is protected and kept in a sanitary condition, and the parts may be easily cleaned, there being only a single wire holder for maintaining the jar and supporting trough in assembled relation. The wire holder for the jar is sufficiently resilient to permit the jar to be readily removed or replaced, and the extremities of the wire snap over the lugs on the under side of the saucer or base.

It will be obvious to those skilled in the art that various changes may be made in my device without departing from the spirit of the invention, and I, therefore, do not limit myself to what is shown in the drawings and described in the specification, but only as set forth in the appended claims.

Having thus fully described my said invention, what I claim as new and desire to secure by Letters Patent, is:

1. A chicken feeder comprising a supporting base provided on its outer edge with opposite outwardly projecting lugs, said lugs extending downwardly in close proximity to the bottom of said base, and an elongated jar holding member formed of an endless piece of wire, the ends of which are turned down to snap over said lugs on the base for securing a jar to said base, substantially as set forth.

2. In a chicken feeder comprising a supporting base having an elevated central portion for directing foodstuffs from the center, radially disposed elongated projections formed integral on the upper surface of the said elevated portion, and a wire jar holding member for holding a jar in inverted position on said base over the said projections, said jar holding member comprising a pair of side members provided with opposite outwardly curved jar engaging portions suitable to flex and tightly engage the neck of a fruit jar and being turned down at their ends and connected to form a hook to snap over the edges of the base, substantially as set forth.

In witness whereof I have hereunto set my hand at Indianapolis, Indiana, this ninth day of March, A. D. nineteen hundred and twenty-nine.

EDWIN W. BOYER.